United States Patent [19]

Palethorpe

[11] 4,163,089
[45] Jul. 31, 1979

[54] METHOD OF POLYMERIZING ACRYLONITRILE WITH CERTAIN ACIDIC MONOMERS

[75] Inventor: George Palethorpe, Durham, N.C.

[73] Assignee: Monsanto Company, Decatur, Ala.

[21] Appl. No.: 577,521

[22] Filed: May 14, 1975

[51] Int. Cl.$^2$ .................................. C08F 220/46
[52] U.S. Cl. .................................. 526/80; 526/87; 526/240; 526/304; 526/334; 526/342
[58] Field of Search ............... 260/79.3; 526/80, 87, 526/240, 304, 334, 342

[56] References Cited

U.S. PATENT DOCUMENTS

| | | | |
|---|---|---|---|
| 3,002,956 | 10/1961 | Perri | 260/79.3 MU |
| 3,033,833 | 5/1962 | Le Fevre et al. | 260/79.3 MU |
| 3,256,252 | 6/1966 | Kruckenberg et al. | 260/79.3 MU |
| 3,310,535 | 3/1967 | Mazzolini et al. | 260/79.3 MU |
| 3,426,104 | 2/1969 | Masson | 260/79.3 MU |
| 3,547,899 | 12/1970 | Arlt et al. | 260/79.3 MU |

Primary Examiner—V. P. Hoke

Attorney, Agent, or Firm—Robert L. Broad, Jr.

[57] ABSTRACT

The process of continuously polymerizing acrylonitrile and other non-acidic mono-olefinic monomers with small amounts of certain acidic mono-olefinic monomers copolymerizable with acrylonitrile wherein the acrylonitrile and other non-acidic mono-olefinic monomers are continuously charged to a reactor and the acidic monomer is fed to the reactor in increments and in cycles, with a tall amount in a given cycle of 0.5 to 5 weight percent of the acidic monomer, based on total monomer weight fed in the cycle, being fed to the reactor during each cycle. Each cycle is made up of two time periods, with at least 65 percent of the acidic monomer being fed during the first time period and up to 35 percent being fed during the second time period. Preferably, all of the acidic monomer is fed to the reactor in the first time period. The first time period of the cycle is 5 to 25 percent of the second time period and the sum of first and second time periods, or cycle time, is about 15 to 25 percent of the reactor dwell time.

4 Claims, No Drawings

METHOD OF POLYMERIZING ACRYLONITRILE WITH CERTAIN ACIDIC MONOMERS

BACKGROUND OF THE INVENTION a. Field of the Invention

This invention relates to improved methods of polymerizing acrylonitrile with certain acidic monomers.

b. Description of the Prior Art

The continuous aqueous slurry polymerization of acrylonitrile polymers is old and known. Typically, the polymerization conditions are adjusted to yield polymer at 65-75 percent conversion, with the unreacted monomers being separated from the polymer and recycled to the reactor. In the case of non-distillable, water soluble monomers or high boiling monomers this approach is often not feasible and the unreacted monomers are lost. Thus, it is desirable to maximize the incorporation of these monomers in the polymerization step.

The reactivity of the monomeric components in a polymerization reaction is governed by the reactivity ratios of the monomers. Unfavorable reactivity ratios can be compensated for to some extent by increasing the concentration of the monomer having the poorer reactivity ratio. However, this adds to the cost of the operation and results in even greater loss of unreacted monomer.

SUMMARY OF THE INVENTION

This invention provides a method for continuously polymerizing acrylonitrile and other non-acidic mono-olefinic monomers with certain acidic monomers wherein the acrylonitrile and other monomers are continuously charged to a polymerization vessel and the acidic monomers are fed to the polymerization reactor in increments and cycles with a total of 0.5-5 weight percent of the acid monomer, based on total monomer weight per cycle, being fed during a given cycle. During a first time period of the cycle at least 65 percent of the acidic monomer is fed to the reactor with up to 35 percent of the acidic monomer being fed during a second time period of the cycle, the two time periods making up the cycle. The first time period is 5 to 25 percent of the second time period and the sum of the two time periods, i.e., the cycle length, is about 15 to 25 percent of the dwell time of the polymerization reactor.

DETAILED DESCRIPTION OF THE INVENTION

The polymerization of acrylonitrile with acidic mono-olefinic monomers is old and known. For example, U.S. Pat. No. 3,426,104 discloses the polymerication of acrylonitrile with certain alkyl allyloxybenzene sulfonates in the presence of a redox catalyst. Specifically, potassium persulfate is used as a catalyst and sulfur dioxide is used as the activator. A small amount of iron, commonly added as ferrous sulfate, is used as the initiator. Other patents fully disclose this or similar polymerization processes. In the present invention the polymerization step may be carried out in the presence of an initiator/catalyst system such as disclosed in U.S. Pat. No. 3,426,104, for example.

Instead of continuously feeding all of the monomers to the reactor as in the prior art, in this process the acrylonitrile and non-acidic monomers are fed continuously while the acidic monomer is fed to the reactor in increments. The acidic monomer is first fed at a high rate, based on total monomer weight, for a first time period and is then fed at a lower rate or not at all for a second time period, the two time periods making up a cycle. The first time period is 5 to 25 percent of the second time period and the sum of the two time periods is 15 to 25 percent of the reactor dwell time. Preferably, the first time period is 15 to 25 percent of the second time period.

At least 65 percent of the total amount of acidic monomer to be fed during a cycle is fed during the first time period of the cycle with up to 35 percent of the acidic monomer being fed during the second time period of the cycle. For example, if 5 percent of the acidic monomer, based on total monomer weight, is to be fed to the reactor during a cycle, then at least 3.25 weight percent will be fed during the first time period with up to 1.75 percent being fed during the second time period. Preferably, all of the 5 percent of this example would be fed during the first time period.

The reactor dwell time in minutes is determined by dividing the volume of the contents of the reactor by the volume of water and monomers fed to the reactor per minute. Typical dwell times range from about 40 to about 80 minutes.

This invention is useful in preparing polymers containing, in polymerized form, about 35 to 85 weight percent acrylonitrile, about 10 to 65 weight percent of a non-acidic mono-olefinic monomer and about 0.5 to 5 weight percent of an acidic monomer such as described below.

Several types of acidic monomers are useful in the practice of the process of this invention. One such monomer has the general structure

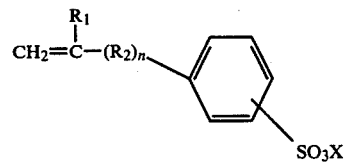

where $R_1$ is H or $-CH_3$, $R_2$ is $-CH_2O-$, or $-CH_2-$, N is 0 or 1 and X is Na, K or H. Typical monomers from this group are methallyl benzene sulfonate, vinylbenzene sulfonate (VBS) and sodium sulfophenyl methallyl ether (SPME).

Another useful acid monomer has the general formula

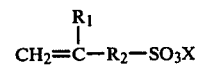

where $R_1$ is H or $-CH_3$, $R_2$ is $-CH_2-$ or a structure of the type

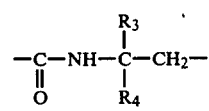

where $R_3$ and $R_4$ are H or $-CH_3$ and X is H, Na or K. Typical monomers from this group are allylsulfonate, methallyl sulfonate and 2-acrylamido-2-methyl propane sulfonic acid and sodium methallyl sulfonate (SMAS).

Still another useful acidic monomer has the formula

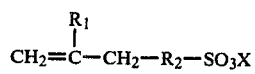

where $R_1$ is H or $-CH_3$, $R_2$ is $-CH_2-$ or $-CH_2CH_2-$ and X is H, Na or K. Typical monomers from this group are sulfoethyl methacrylate (SEM), sulfomethyl methacrylate and sulfoethyl acrylate.

The preferred acidic monomers are sodium sulfophenyl methallyl ether (SPME) and 2-acrylamido-2-methyl propane sulfonic acid or the sodium, potassium or ammonium salts of this acid.

EXAMPLE I

In two separate runs monomer solutions containing acrylonitrile (AN), vinylidene chloride ($VCl_2$), vinyl bromide (VBr) and an acid monomer, Na-p-sulfophenyl methallyl ether (SPME) were charged to a reaction vessel and a polymerization reaction was carried out in the presence of the activator/catalyst system and under conditions such as disclosed in U.S. Pat. No. 3,426,104. In one of the runs, identified as Run A in Table 1 below, all of the monomers were fed to the reaction vessel continuously and at a uniform rate. In the other run, identified as Run B in Table 1, monomer feed was continuous as in Run A with the exception that the amount of SPME which in a conventional process would have been fed into the reactor over a continuous period of 15 minutes was fed into the reactor in a period of 2.5 minutes. During the next 12.5 minutes water was substituted for the SPME feed. After a total of 15 minutes, SPME was again fed for a period of 2.5 minutes and then again replaced by water during the next 12.5 minutes. The 1.8 weight percent of SPME fed during each 2.5 minute period was based on the total monomer feed during the 15 minute period making up the cycle. The feed cycles were continued throughout the run. The feed time, or first period, was 20 percent of the non-feed time, or second period. The dwell time in the reactor was 60 minutes, so that the sum of the first time period and the second time period, or cycle time, amounted to 25 percent of the dwell time.

Table 1 below shows monomer feed rates.

Table 1

| | Feed Rates (weight percent) | | | | |
|---|---|---|---|---|---|
| | AN | $VCl_2$ | VBr | SPME | $H_2O$ |
| Run A | 63.9 | 19.6 | 13.5 | 2.3 | 400 |
| Run B | 64.4 | 19.6 | 13.5 | 1.8 | 400 |

The polymers obtained from Runs A and B were analyzed in a conventional manner and the results shown in Table 2 where obtained:

Table 2

| Run | A | B |
|---|---|---|
| n | .14 | .14 |
| % VBr | 11.9 | 9.9 |
| % $VCl_2$ | 21.4 | 19.6 |
| % SPME | 1.88 | 1.90 |
| % Conversion | 65 | 65 |

From this it can be seen that the SPME incorporation in Run B was essentially equivalent to that in Run A even though in Run A about 28 percent more SPME monomer was fed to the reactor than in Run B.

EXAMPLE II

Runs A and B were repeated with the sodium salt of acrylamido methyl propane sulfonic acid (SAMPS) being substituted for SPME. In the absence of a direct method of determination of polymer SAMPS content, the basic dye acceptance (BDA) of a fiber made from the polymer was taken as a measure of incorporation of SAMPS, as shown in Table 3. BDA was determined in a conventional manner.

Table 3

| | BDA | Conversion | Polymer $n_{sp}$ |
|---|---|---|---|
| C. 4% SAMPS/continuous feed | 23.0 | 69.5 | .14 |
| D. 2.5% SAMPS/intermittent feed | 22.9 | 65 | .15 |

The BDA in Run D was substantially the same as in Run C, even though 60 percent more monomer was fed to the reactor in Run C where the monomer was fed continuously.

EXAMPLE III

Various polymerization runs were made using SAMPS as the acidic monomer, using an effective amount of an initiator/catalyst system as described above. Other monomers, which were fed to the reactor continously, were about 63 percent AN, about 14 percent VBr and about 20 percent $VCl_2$, all percentages being based on total monomer weight. In Run E, which was made as a control, the SAMPS was fed to the reactor at a continuous, uniform rate, whereas in Runs F–R this acid monomer was fed to the reactor in cycles at a variable rate as indicated in Table 4. The BDA of fibers made from the polymers formed were taken as the measure of incorporation of the SAMPS.

The length of the first time period, i.e., the period in which the acid monomer was added at a higher rate, was 2.5 minutes in Runs F–R. The second time period, or that period during which the acid monomer was fed at a reduced rate or not at all, was 10 minutes in Runs F–Q and 12.5 minutes in Run R. The dwell time in each of the runs was 50 minutes with the exception of Run R, where the dwell time was 60 minutes. Thus, Runs F–Q the first period was 25 percent of the second time period and the sum of the two time periods, or cycle time, was 25 percent of the dwell time. In Run R the first period was 20 percent of the second period and the sum of the periods, or cycle time, was 25 percent of the dwell time.

Table 4

| | Monomer Feed (weight percent) | | | Conversion | |
|---|---|---|---|---|---|
| Run | 1st Pd. | 2nd Pd. | $n_{sp}$ | Percent | BDA |
| E | 4% continuous | | 0.141 | 69 | 23 |
| F | 2 | 1 | 0.15 | 72 | 22.1 |
| G | 2 | 1 | 0.14 | 75 | 24.2 |
| H | 2 | 1 | 0.15 | 68.5 | 22.8 |
| I | 2 | 1 | 0.17 | 70.5 | 22.4 |
| J | 2.5 | 0 | 0.115 | 77 | 15.7 |
| K | 2.5 | 0 | 0.15 | 69 | 19.9 |
| L | 2.5 | 0 | 0.14 | 65 | 22.9 |
| M | 2.5 | 0 | 0.147 | 65 | 21 |
| N | 2.7 | 0 | 0.169 | 70 | 20 |
| O | 2.7 | 0 | 0.162 | 76.5 | 20.1 |
| P | 3 | 0 | 0.15 | 65.5 | 23.3 |
| Q | 3 | 0 | 0.16 | 69 | 21.5 |
| R | 3 | 0 | 0.137 | 76 | 22.2 |

It should be emphasized that the feed rates shown in Table 4 under the heading 1st period and 2nd period are weight percentages of the total monomer feed during the combined time intervals of both periods. For example, if in Run F the total monomer feed during that time interval of 12.5 minutes making up the sum of the first and second periods, or cycle, is 100 kg then 2 kg of the acid monomer was fed during the first period of the cycle and 1 kg was fed during the second time period.

It will readily be seen that over an extended period of time the total amount of acidic monomer fed to the reactor will be, based on total monomer feed during that period, the same percentage value as shown in Table 4 for a given cycle. For example, if the cycle represented by Run F in Table 4 is continually repeated over an extended time period, then the total amount of acid monomer fed during that time period will be 3 weight percent of the total monomer feed for that period.

From Table 4 it can readily be seen that the fiber BDA of control Run E, where acid monomer was fed continuously was not significantly better than in most of the other runs even though the acid monomer was fed in an amount of about 33 percent more in this run than in the other runs.

EXAMPLE IV

Run D of Example 1 was repeated by making two further runs under the same conditions. In one of the runs the polymer had an $n_{sp}$ of 0.182 and a 60 percent conversion. BDA, which was taken as a measure of incorporation of the SPME, was 26. In the other of these runs the polymer had an $n_{sp}$ of 0.160 and a conversion of 65 percent. The BDA of the polymer from this run was 27.3.

EXAMPLE V

Runs A and B of Example I were repeated using sodium methallyl sulfonate (SMAS) instead of SPME. In one of these runs the SMAS was fed at a rate of 2.3 weight percent on a continuous basis and produced a polymer which had a BDA of 20.9. In the other of these runs the SMAS was fed at a lower rate and under the time conditions of Run B of Example I, the feed rate being 2.0 weight percent based on total monomer weight for the sum of the first and second periods. This polymer has a BDA of 21.1.

By using the process of this invention lower amounts of the acidic monomer can be fed to the reactor without significantly reducing the amount of monomer incorporated in the fiber. This represents a direct saving in monomer cost.

What is claimed is:

1. In a method of continuously polymerizing in the presence of an effective initiator/catalyst system 35 to 85 weight percent, based on total monomer weight, of acrylonitrile with 10 to 65 weight percent of at least one non-acidic monoolefinic monomer copolymerizable with acrylonitrile and 0.5 to 5 weight percent of an acidic monomer selected from the group consisting of

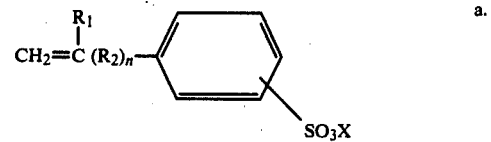

where $R_1$ is —H or —$CH_3$, $R_2$ is —$CH_2O$—, —O—, or —$CH_2$—, n is 0 or 1 and X is Na, K or H,

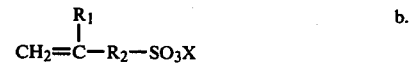

where $R_1$ is —H or —$CH_3$, $R_2$ is —$CH_2$— or a structure of the type

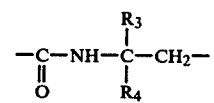

where $R_3$ and $R_4$ are H or —$CH_3$ and X is H, Na or K, and

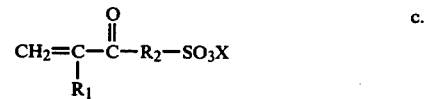

where $R_1$ is H or —$CH_3$ and $R_2$ is —$CH_2$— or —$CH_2CH_2$— and X is H, Na or K wherein the acrylonitrile and the nonacidic mono-olefinic monomer are continuously charged to a reaction vessel having a predetermined dwell time, the improvement comprising feeding to the reaction vessel at least 65 percent of said acidic monomer percent in a first time period and then feeding the remainder of said acidic monomer in a second time period, said first and second periods making up a cycle, said first time period being 5 to 25 percent of the second time period and the length of the cycle being 15 to 25 percent of said dwell time.

2. The method of claim 1 wherein all of the acidic monomer to be fed during said cycle is fed during the first time period.

3. The method of claim 2 wherein the first time period is 15 percent to 25 percent of the second time period.

4. The method of claim 2 wherein the acidic monomer is selected from the group consisting of sodium sulfophenyl methallyl ether, 2-acrylamido-2-methyl propane sulfonic acid and the sodium, potassium and ammonium salts of 2-acrylamido-2-methyl propane sulfonic acid.

* * * * *